A. BONOM.
BEARING.
APPLICATION FILED NOV. 14, 1913.
1,108,064.
Patented Aug. 18, 1914.
2 SHEETS—SHEET 1.
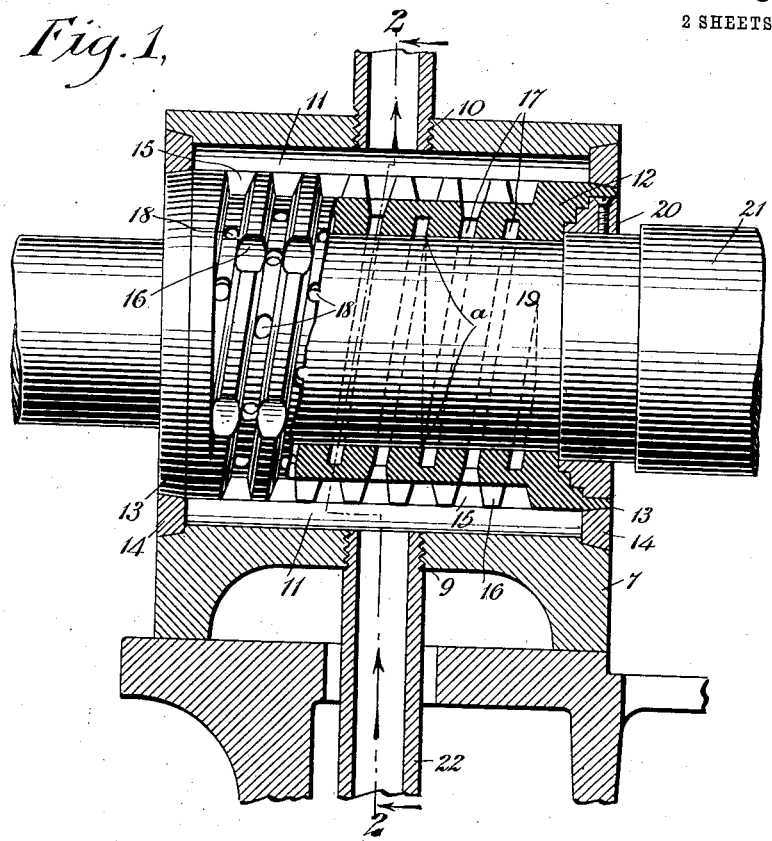
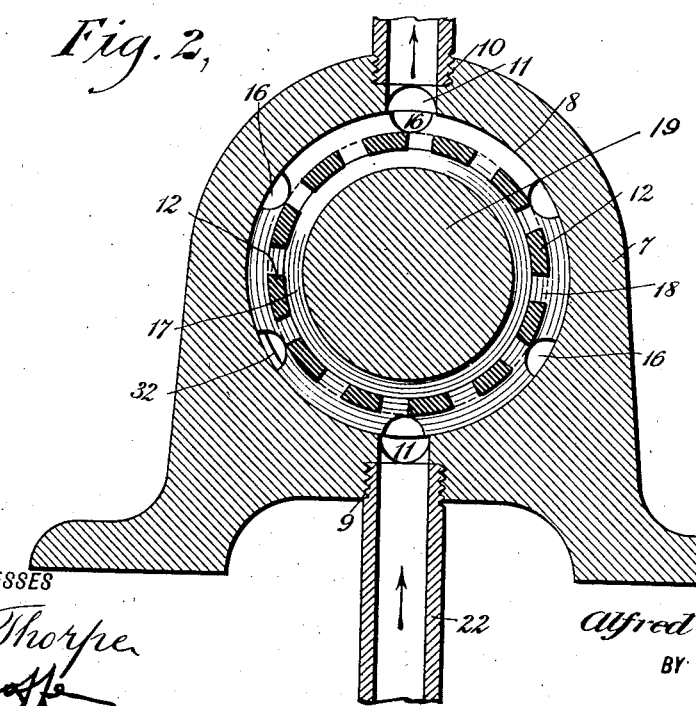
WITNESSES
Edw. Thorpe
B. Jaffe
INVENTOR
Alfred Bonom
BY Munn & Co
ATTORNEYS A. BONOM.
BEARING.
APPLICATION FILED NOV. 14, 1913.
1,108,064.
Patented Aug. 18, 1914.
2 SHEETS—SHEET 2.
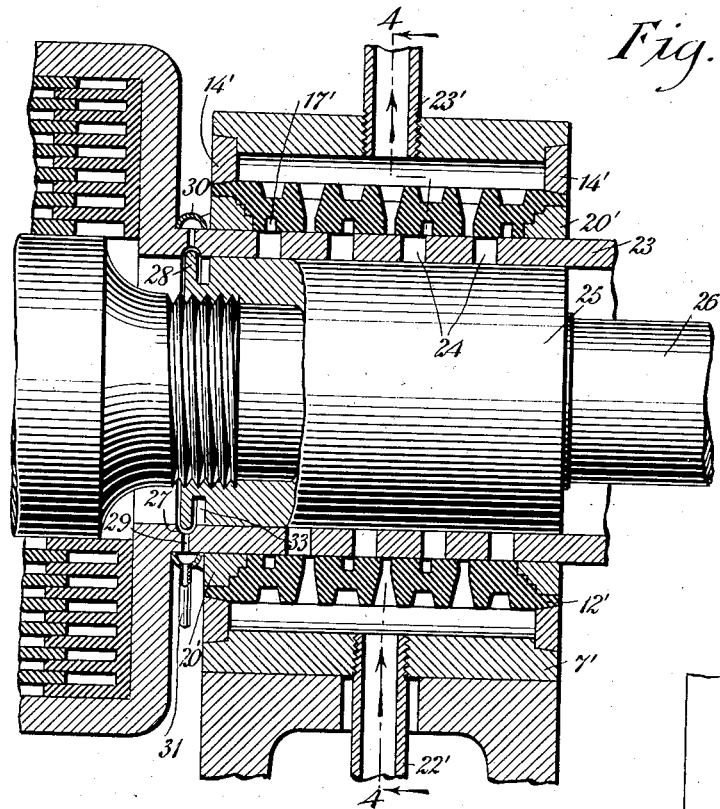
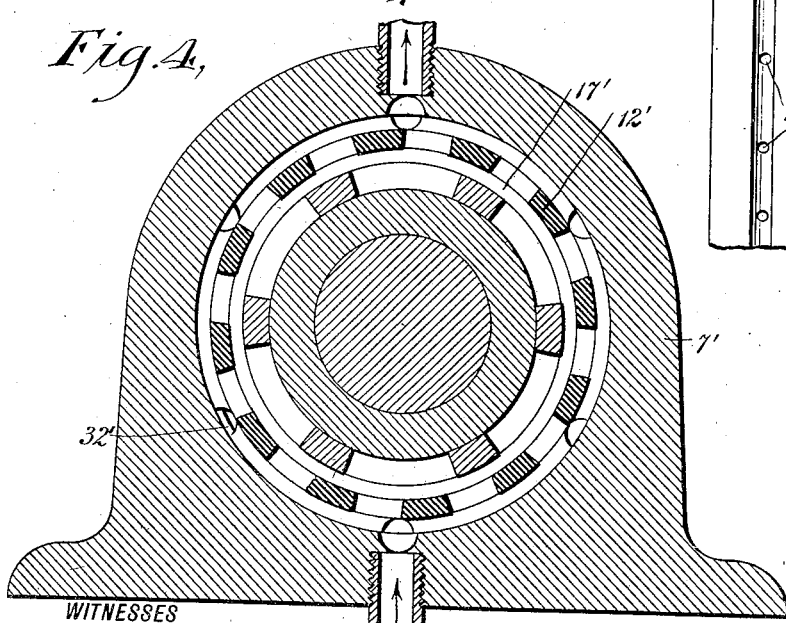
WITNESSES
Edw. Thorpe
B. Joffe
INVENTOR
Alfred Bonom
BY
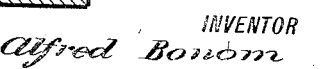
ATTORNEYS

UNITED STATES PATENT OFFICE.

ALFRED BONOM, OF PATERSON, NEW JERSEY.

BEARING.

1,108,064.  Specification of Letters Patent.  Patented Aug. 18, 1914.

Application filed November 14, 1913. Serial No. 800,938.

*To all whom it may concern:*

Be it known that I, ALFRED BONOM, a citizen of France, and a resident of Paterson, in the county of Passaic and State of New Jersey, have invented a new and Improved Bearing, of which the following is a full, clear, and exact description.

My invention relates to bearings of the pedestal type, and has reference more particularly to turbine shaft bearings.

An object thereof is to provide a simple, compact and efficient bearing having means whereby the journal therein is automatically oiled.

A further object of the invention is to provide a bearing that will accommodate concentric shafts adapted to rotate in opposite directions and which will automatically oil the journals of both shafts.

A still further object of the invention is to provide a bearing wherein every portion of the journal, or journals, receives oil continuously.

I obtain the above objects by providing a journal box having preferably a removable bearing seat, which seat is provided with exterior and interior grooves inclined to the axis of the seat and communicating therebetween; and means for forcing oil through the journal box and about said seat.

The invention consists of the construction and combination of parts to be more fully described hereinafter and fully set forth in the claims.

Reference is to be had to the accompanying drawings forming a part of this specification, in which like characters indicate corresponding parts in all the views and in which:

Figure 1 is a longitudinal vertical section through a bearing embodying my invention for a single journal; Fig. 2 is a section on line 2—2, Fig. 1; Fig. 3 is a longitudinal vertical section of a bearing embodying my invention having a concentric shaft adapted to rotate in opposite directions; Fig. 4 is a section on line 4—4, Fig. 3; and Fig. 5 is a development of the journal portion of the outer shaft.

Before proceeding to a more detailed description of my invention, it must be clearly understood that while the disclosure of the bearing structure is better adapted for use with turbines, the same can be as efficiently used for any other purpose.

Referring to the drawings, the journal box 7 is preferably formed of a single casting, but if desired the same can be formed of two parts. It has a central axial bore 8, an oil inlet 9 leading to said bore 8 in the bottom of the box 7, and an outlet 10 from the bore 8 diametrically opposite the said inlet 9. The bore 8 is also provided with diametrically opposite longitudinal grooves 11, one central with the inlet and the other with the outlet of the bore.

Fitting snugly into the bore of the box 7 is a bearing seat 12 having the shape of a sleeve, the outer extremities 13 of which are beveled and adapted to be engaged by rings 14 provided at each end of the box 7 and adapted to be secured thereto in any suitable way and whereby said bearing seat 12 is packed in said bore 8. It is understood that if the journal box 7 is formed in two parts, the bearing seat 12 can be also formed of two or more parts. The exterior lateral surface of the bearing seat 12 is provided with a series of circular grooves 15 inclined to the axis of the bearing and interconnected therebetween by means of longitudinal grooves 16 provided on the said outer surface of the bearing seat and extending substantially parallel to the longitudinal axis of said seat. The inner lateral surface of the seat 12 is also provided with circular grooves 17 inclined similarly to the grooves 15 with respect to the bearing axis. The inner grooves 17 are made to be in alinement with the exterior grooves 15, that is, each inner groove is superposed by an exterior groove, and it communicates with its corresponding inner groove by means of apertures 18 provided at intervals between the grooves in the body of the seat 12. The inclination of the grooves is such that the projection of opposite portions of adjacent grooves will slightly overlap each other. See Fig. 1, as shown in dotted line and indicated by a—a. This provision permits the consecutive grooves to cover the entire surface of the journal 19 engaging the bearing surface of the bearing seat 12. The ends of the bearing seat 12 are packed by means of stepped rings 20 secured in any suitable way to the shaft 21 adjacent the journal 19 and whereby oil is prevented from leaking at the ends of the bearing seat 12.

The oil is forced into the bore 8 through a pipe 22 connected to the inlet 9 where it is distributed in the longitudinal groove 11 of the bore and therefrom to the circular grooves 15 lying across the said longitudinal groove 11. The groove 16 interconnecting the circular groove helps to distribute the oil forced into the box more uniformly between all the grooves 15. The oil, passing about the grooves 15 before it finds its outlet through the pipe 34 connected to the outlet 10, passes through apertures 18 into the inner grooves 17, as the resistance to the flow of oil is such as to keep all the grooves flooded with oil.

In the modified form shown in Figs. 3, 4 and 5, the box 7' is provided with a bearing seat 12' sealed therein by rings 14', similar to those disclosed for the structure shown in Figs. 1 and 2. The ends of the bearing seat 12 are packed similarly by stepped rings 20', secured in this case to a hollow shaft 23 connected to one of the turbine rotors. The journal of this hollow shaft is provided with a series of longitudinal apertures 24 adapted to supply oil from the grooves 17' to the journal 25 of the inner shaft 26, which bears in the said hollow shaft 23. The said apertures 24 in the hollow shaft 23 are so formed as to supply every point of said journal during its rotation with oil from the inner grooves 17'. The hollow or tubular shaft 23, being connected to the rotor, carries therein the fluid pressure, which is prevented from entering into the bearing by the provision of a seal, in forming a circular groove 27 on the inner surface of the tubular shaft 23 adjacent the rotor portion. A disk 28 carried by the journal 25 engages said groove, the space formed between said groove and disk being such as to condense the fluid tending to pass therebetween and thereby form a seal, the excess of condensed liquid escaping through a series of apertures 29 provided in the tubular shaft 23 and leading to a circular stationary trough 30 formed about the tubular shaft 23, the said trough being provided with an outflow tube 31 to carry off the condensed fluid. The flow of fluid to the bearing surface is further resisted by the film of oil formed in the neck 33. The journal 25 secured to the shaft 26 can be formed, if desired, similar to the bearing seat 17'. The oil is supplied to said box 7 in a similar manner to that described for the structure shown in Figs. 1 and 2 by means of a pipe 22' and carried off by means of a pipe 34'.

The bearing seats are prevented from rotation within the bores of the casing by the provision of a key secured in any suitable way to the bearing box and engaged by one of the longitudinal grooves of the bearing seat, connecting the exterior or circular grooves of said seat, as shown in Fig 2 by character reference 32, and in Fig. 4 by character reference 32'. The said key does not need to extend through the entire length of the journal box but only adjacent the ends thereof, so as to facilitate the circulation of oil in said groove engaging the key.

Having thus described my invention, I claim as new and desire to secure by Letters Patent:

1. In a bearing, a journal box; a bearing seat in said box having circular, independent grooves on the exterior surface thereof inclined to the axis of the bearing, said bearing seat having means establishing communication between the grooves and the inner bearing surface of the seat, said means being so formed as to cover with oil every point of the journal engaging the bearing surface of said seat; and means for forcing oil through said box about said bearing seat.

2. In a bearing, a journal box; a bearing seat in said box having circular, independent grooves on the inner and outer surface thereof inclined to the axis of the bearing, said seat having means establishing communication between the grooves; and means for forcing oil into said grooves.

3. In a bearing, a journal box; a circular bearing seat fitting snugly into said box and having circular, independent grooves on the exterior surface inclined to the axis of the seat, said seat having means establishing communication between said grooves in the box and means establishing communication between the groove and the bearing surface of the seat; and means for forcing oil into said box through said grooves substantially as and for the purpose set forth.

4. In a bearing, a journal box; a circular bearing fitting snugly into said box and having circular, independent grooves on the exterior and interior surface inclined to the axis of the bearing, said bearing seat having longitudinal grooves on the exterior surface thereof connecting the exterior grooves and means connecting the exterior and interior grooves; and means associated with the box for supplying oil under pressure to said grooves.

5. In a bearing, a journal box; a bearing seat in said box and having interior and exterior grooves, each corresponding exterior groove having a corresponding inner groove, said seat having means establishing communication between corresponding grooves and longitudinal grooves on the exterior surface connecting the exterior grooves; and means associated with the box for feeding oil under pressure to said grooves of the seat.

6. In a bearing, a journal box; a cylindrical bearing seat fitting snugly into said box and having internal and external circular grooves inclined to the axis of the seat, each of said external grooves having a corresponding internal groove; apertures in said seat connecting the corresponding interior and exterior grooves and longitudinal grooves on the exterior surface of the seat interconnecting said exterior circular groove, said box having means therein adapted to engage one of said longitudinal grooves whereby said bearing seat is keyed in said box; a journal engaging said bearing seat; and means for supplying oil under pressure to said box, substantially as and for the purpose set forth.

7. In a bearing, a journal box; a bearing seat fitting snugly into said box and having a plurality of exterior and interior circular grooves, each of said exterior grooves having a corresponding interior groove, said seat having means establishing communication between the corresponding exterior and interior grooves and means establishing communication between the exterior grooves; means for supplying oil under pressure to said grooves; a tubular shaft journaling in said bearing seat; a solid shaft journaling in said tubular shaft, said tubular shaft having longitudinal apertures adapted to lead the oil from the inner grooves of said seat to the journaling surface of said solid shaft.

8. In a bearing, a journal box; a bearing seat fitting snugly into said box and having a plurality of independent exterior and interior circular grooves, said exterior and interior grooves being parallel to each other and inclined to the axis of the bearing, each of said exterior grooves having a corresponding interior groove, said seat having apertures establishing communication between the corresponding exterior and interior grooves, said seat having longitudinal grooves establishing communication between the exterior circular groove; means for supplying oil under pressure to said grooves; a tubular shaft journaling in said bearing seat; a solid shaft journaling in said tubular seat; a solid shaft journaling in said tubular shaft, said tubular shaft having longitudinal apertures adapted to convey the oil from the inner grooves of said seat to the journaling surface of said solid shaft.

9. In a bearing, a journal box; a bearing seat fitting snugly into said box and having a plurality of independent exterior and interior circular grooves, said exterior and interior grooves being in parallel planes inclined to the axis of the bearing, the inclination of said inner grooves being such that the adjacent grooves overlap in projection on a plane, each of said exterior grooves having a corresponding interior groove, said seat having apertures establishing communication between the corresponding exterior and interior grooves, said seat having also longitudinal grooves establishing communication between the exterior, independent, circular grooves; means for supplying oil under pressure to said grooves; a tubular shaft journaling in said bearing seat; and a solid shaft journaling in said tubular shaft, said tubular shaft having apertures adapted to lead the oil from the inner groove of said seat to the journaled surface of said solid shaft.

In testimony whereof I have signed my name to this specification in the presence of two subscribing witnesses.

ALFRED BONOM.

Witnesses:
BENEDICT JOFF,
PHILIP D. ROLLHAUS.